Jan. 15, 1963    E. IMMEL    3,073,173
VARIABLE RATIO TRANSMISSION
Filed June 1, 1959
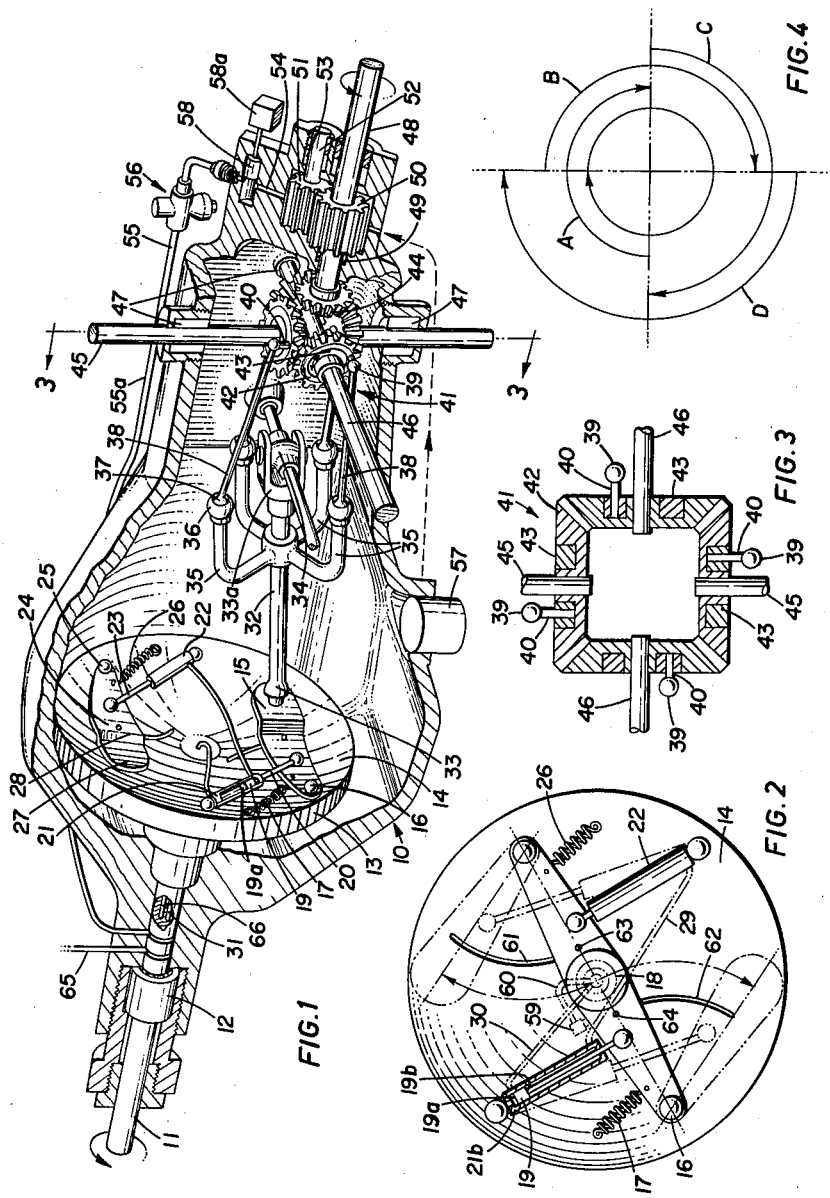
Inventor
ERICH IMMEL
by: Cavanagh & Norman

United States Patent Office 3,073,173
Patented Jan. 15, 1963

3,073,173
VARIABLE RATIO TRANSMISSION
Erich Immel, 251 Huron St., Toronto, Ontario, Canada
Filed June 1, 1959, Ser. No. 817,306
21 Claims. (Cl. 74—114)

This invention relates generally to a mechanism for transmitting power from a driving shaft to a driven shaft.

Transmissions presently in use in the field of automotive equipment comprise several different methods of power transmission which are well known in the art and utilize in many instances, a turbine blade arrangement whereby power is transmitted to a movable fluid, which in turn, is directed to the blades of a rotor, thereby transmitting power to the driving wheels of the vehicle while overcoming torque reaction.

The large number of moving parts required in present transmissions of this and other types require extensive servicing and, in many instances, a large amount of labour is necessarily expended in replacing a single part, requiring a stripping down, in some instances, of the entire transmission.

In general, present transmissions have two or more driving ranges or selections, each containing different fixed gear ratios for overcoming torque imposed when starting the vehicle to attain its driving speed. Intermediate shifting is ordinarily accomplished through providing gear trains to effect higher fixed ratios, in steps, until the required speed is reached. During acceleration and upon attaining a predetermined speed, a higher fixed ratio is automatically provided, thus creating a stress on the engine due to increased torque, particularly at the moment the "drop" into the higher ratio is effected. Transmissions now in use register a distinct shift from the first to succeeding ratios, thus requiring racing of the engine in the lower ratio to provide adequate speed and a shift to a higher ratio, and immediately imposing a higher stress on the axle, drive shaft, transmission and engine. Similarly, upon acceleration of the vehicle, increased torque is provided which must be overcome by the engine through a fixed gear ratio with a consequent increase in wear due to the increased strain produced.

The loss of efficiency due to friction between the excessive number of moving parts in present transmissions reflects upon the efficiency of the motive force, particularly in the case of the fluid type connection of present transmissions which, in addition to requiring the movement of a large mass of fluid, causes a lag in acceleration due to the flexibility of the fluid, resulting in slippage and reduced efficiency.

The latter type of transmission was primarily developed to provide a non-mechanical linkage between the moving force and the driving wheels in the interests of smooth operation, whereas it is well known that the highest efficiency results from a direct mechanical linkage between the driving elements and the prime mover.

It has long been felt that a simplified purely mechanical linkage or transmission may be developed to reduced the number of working parts, whereby the highest efficiency may be maintained and smooth acceleration or operation developed. In addition, it is felt that a transmission should develop torque at the driving wheels as needed, rather than exerting full torque through the driving wheels and transmission to the engine until the required speed is reached.

The present transmissions as noted above, overcome the inertia of the vehicle ordinarily through a two-step change, which is the automatic feature, changing from a low ratio to overcome the standing inertia to a high ratio to maintain speed above a pre-determined limit.

Present automatic transmissions, in the main, require one or more planetary units which require gear changes effected by means of frictions bands applied to the drums, the clutches being engaged or disengaged by means of hydraulic pressure. The number of parts required in such devices creates a friction component of excessive magnitude which must be overcome by the engine or power source before power is transmitted to the wheels, thereby reducing efficiency. The high pressures involved in engaging or disengaging clutches for changing gear ratios require highly pressurized systems which are conducive to leakage and wear, wherein the slightest amount of dirt of foreign matter may render the mechanism useless, especially in view of the fact that narrow constrictions or passages in the presseure system may easily become blocked.

Heat and expansion problems encountered in modern automatic transmissions create a propensity for oil leakage from the system, especially due to the fact that temperature gradients between moving parts forming the pressurized system cause relatively high distortion of one part, which, in mating with another part at a lower temperature, causes gap and subsequent leakage, together with early wear of the parts.

Variable throw transmissions have been devised in the past. However, due to the shortcomings of the means of transmitting the driving force, the working parts and transmission as a whole have become inefficient and impractical due to their excessive weight and the requirement for heavier suspension. The increased efficiency of such transmissions does not compensate for the increased weight and, as a result, variable-throw transmissions have not been utilized to a degree formerly felt possible.

The relatively small number of moving parts required in this type of transmission creates an advantage over existing automatic transmissions in providing a higher efficiency in fuel consumption, wherein, due to the mechanical linkage, no slippage is encountered, and an infinitely variable torque is achieved, dependant upon the requirements and conditions under which the vehicle has to be moved.

The variable throw transmission contemplates the operation of an engine at its maximum torque, bearing in mind the prevention of undue stress to any of its parts. In this manner, the efficiency of the engine is elevated, and, as previously stated, slippage is not encountered.

Prior attempts to provide a variable-throw transmission have failed economically due to the requirement for heavy housing and inefficient intermediate linkage, together with difficulties encountered in providing a balancing means for a rapidly rotating mass. However, the advantages to be gained by such transmissions are considerable, for example, as stated above, an increased opperating efficiency together with substantial wear prevention due to the fact that engine speeds may be kept to a minimum, depending upon the ratios to be used. The variable throw transmission is capable of utilizing infinitely small variations in ratios from slightly greater than zero to a high of 1 to 1.

It is therefore, a main object of this invention to provide a novel automatic transmission which will deliver power to a driven shaft as required.

It is a further object of the invention to provide a transmission wherein motion of the driven shaft delivers impetus to the transmission to increase the delivery of power from the engine in a smooth manner without imposing excessive strain on the transmitting members.

It is another object of the invention to provide a variable-throw transmission including gear means adapted to convert power smoothly from a rotatable source to a driven shaft.

It is another object of this invention to provide a variable throw transmission wherein the rotating mass is compensated for by means of an integral balancing mass in coordination with the rotating mass.

Conveniently, the invention may provide a mechanism adapted to transmit power from a drive shaft to a driven shaft at various speed ratios and comprising: universal joint means; a crank arm having one end attached to said universal joint; gear means; means on said crank arm and in communication with said gear means to impart driving motion to the gear means upon motion of the crank arm; means communicating the driving motion from said gear means to the driven shaft; displaceable means attached to the end of said crank arm remote from the universal joint; means driving said displaceable means in a circular path in synchrony with said drive shaft whereby said crank arm is caused to describe a cone-like path of rotation having its apex defined by the universal joint and its base defined by the path of rotation of the displaceable means; and means controlling the position of said displaceable means whereby the radius of the base of the cone may be varied.

Other objects and advantages of the invention will become apparent upon consideration of the specification and drawings wherein there is described a preferred embodiment of the invention in which:

FIGURE 1 is a view in perspective of a variable-throw transmission of the invention with the housing thereof indicated in section and partially broken away to reveal the main working parts;

FIGURE 2 is a view in elevation of the face of the fly wheel of the transmission;

FIGURE 3 is a view in section taken along the line 3—3 of FIGURE 1;

FIGURE 4 is a schematic diagram of the cycle of action of the gear means.

The variable-throw transmission comprises an outer housing, generally indicated by reference numeral 10. A power input or drive shaft 11 is disposed within said housing for rotation therein, shaft being supported by means of bearing 12 of any suitable form. A fly wheel 13 or other supporting means is rigidly attached to shaft 11 by any suitable means, such as by keying or other locking means well known in the art.

In FIGURE 1, the fly wheel 13 and attendant parts, to be hereinafter described and explained, are indicated in a position normally attained during operation of the vehicle.

The face 14 of the fly wheel 13 pivotally supports, adjacent the periphery thereof, a throw crank 15 in the form of a lever at pivot point 16. The throw crank 15 is normally maintained in a position indicated in FIGURE 2 under the bias of spring 17, crank extremity 18 remote from pivot 16 being maintained centrally located on the face 14 of the fly wheel 13, when the vehicle is stationary.

A double-acting piston 19, having piston faces 19a and 19b, is attached to throw crank 15 by means of connecting rod 20 through a swivel connection, a cylinder 21 being pivotally maintained on surface 14 of fly wheel 13 in the position indicated. It is contemplated that cylinder 21 may be rigidly fixed to fly wheel 13 and that there may be provided a surface on throw crank 15 for slidable engagement by the connecting rod 20 upon swinging of throw crank 15 about its pivot point 16.

Cylinder 22 is similarly located on face 14 of the fly wheel 13 as indicated in FIGURES 1 and 2, diametrically opposed to cylinder 21. A piston (not shown) within the cylinder 22 is attached to connecting rod 23, which in turn is connected to a throw balance lever 24 through a swivel mounting or other suitable means 25, whereby movement of the piston effects a comparable movement to the throw balance lever 24 against the bias of spring 26, the throw balance lever 24 being attached by means of a pivotal mounting in the same manner as the throw crank lever 15 described hereinbefore. The throw balance lever 24 has a balance extremity 27 which is recessed below the plane surface thereof, as defined by shoulder 28. The throw balance lever 24 attains its normal position, as shown in FIGURE 2, under the bias of spring 26, the extremity 18 of throw crank lever 15 being adapted to overlie the extremity of the crank or throw balance lever 24, as indicated in FIGURE 2.

The connecting rod end 21a of cylinder 21 is in communication with an oil line 29, FIGURE 2, which line in turn is in communication with cylinder 22. The other end 21b of cylinder 21 is connected to oil line 30, which line is in turn connected to a main oil line or hydraulic fluid line 31, FIGURE 1, disposed within shaft 11.

A crank arm 32 is swively mounted upon the extremity 18 of crank throw lever 15, by means of a swivel pin 33 or other suitable means, the crank arm 32 at its outer extremity, remote from the crank throw lever 15, being provided with a connecting member 33a pivotally connected to a rigid bracing member through a universal joint 34 or other connecting means such as a ball and socket joint, in a manner well known in the art, the crank arm 32 thereby having two pivotally connected ends, one of which remains relatively stationary, the other being adapted for rotation about a theoretical axis intersecting said first pivotal end, and, during rotation, the arm 32 generating a theoretical cone having a variable apex angle determined by the radius of rotation of the pivotal end of arm 32 corresponding with extremity 18 of crank throw lever 15.

The free end or extremity 27 of balance lever 24 embodies a weighted means counterbalancing the end of the crank arm 32 fixed to the extremity 18 of throw crank lever 15.

The crank arm 32 intermediate of its ends is provided with extension members 35 radially disposed thereabout, each in fixed relation thereto. As shown in FIGURE 1, the outer extremities of the extension members are provided with sockets 36 for cooperation with ball members 37, to form ball-socket joints. The extension members 35 are formed such that the sockets 36 are radially disposed about the crank arm 32 and facing away from fly wheel 13. Actuating rods 38 are provided having ball members 37 at the ends thereof for engagement with sockets 36 of extension members 35. Ball members 39 are provided at the ends of actuating rods 38 remote from extension members 35, said ball members 39 being connected to pin members 40 by any suitable means and effectively transmitting the motion produced in corresponding extension members 35 thereto.

In FIGURE 1 there is shown a gear assembly 41 comprising a series of ratchets, preferably four in number, including an upper and a lower ratchet in horizontal parallel relationship, and two side ratchets disposed perpendicularly to the upper and lower ratchets, their relative positions being indicated in FIGURE 3.

Each of the ratchets 41 includes an outer toothed portion or gear ring 42 and an inner annular portion 43 to which is attached rigidly a pin 40. The ratchets are of conventional design in the form of a one-way clutch, permitting free wheeling in one direction and engagement of the toothed portion of the inner portion 43 in the opposite direction. It is contemplated that other forms of one-way clutches may be utilized, and it is not intended to restrict the invention to the use of ratchet means.

The gear teeth of each side ratchet are in engagement with the upper and lower ratchets and meshed at all times as indicated in FIGURES 1 and 3, the lower ratchet serving also as a crown gear in engagement with a pinion gear 44.

The upper and lower ratchets are joined to a common vertical shaft 45 the side ratchets being joined to a common horizontal shaft 46 each of the shafts 45 and 46, being journalled within the housing 10 in bearings 47 to permit rotation of the shafts. The shafts 45 and 46 are indicated in FIGURE 1 partially in broken line to indicate that the same may be carried through the housing to form power take-offs at four points if so desired. It is contemplated however, that the shafts may be fixed to the housing, thereby requiring a bearing for each ratchet for rotation about its respective shaft.

The pinion gear 44 is rigidly attached by means of a spline or other suitable means to an output or driven shaft 48 journalled within the housing 10 through bearing 49 in the usual manner. The outer end of the output shaft is engageable with a conventional rear end differential (not shown).

Intermediate of the pinion end and the outer end of shaft 48, spur gear 50 is provided in fixed relation with said shaft for rotation therewith and aligned for engagement with an idler gear 51 on shaft 52 similarly journalled within the housing 10 through bearing 53, gears 50 and 51 acting to form a conventional gear pump which communicates with pressure line 54.

The oil or pressure line 54 is in communication with main hydraulic line 55 through a vacuum diaphragm 56 to be described hereinafter. Line 55 is schematically shown in FIGURE 1 by means of dotted line 55a, with the flow direction as indicated by arrows, to communicate with oil line 31, thereby forming a pressurized well between the housing 10 and the shaft 11. It is to be realized that there are other means of communicating pressure from line 55 to line 31, and that, the foregoing is meant for the purposes of example only.

The hydraulic circuit comprises pressure line 55 in communication with line 31 to the center of the fly wheel 14, thence in communication with line 30 to the outer end 21b of double acting cylinder 21, normally filled with oil, the piston 19 being displaceable under oil or fluid pressure to an inner position, thereby forcing oil into line 29 in communication with cylinder 22, as indicated in FIGURE 2 for acting on the piston therein (not shown). While it is contemplated that lubrication of the system may be effected through any known means, it is preferred that the lower portion be utilized as a sump, the oil passing through filter 57. Spray lubrication of moving parts may be used. Pressure lubrication through journals would also be satisfactory.

Intermediate of the gear pump 50 and 51 and the vacuum diaphragm 56 there is provided a valve 58 actuated by a solenoid 58a of conventional design, the purpose of which is to be hereinafter described in detail.

As indicated in FIGURE 2 by the reference numeral 59 there is provided a cylinder and piston in engagement with crank throw lever 15, said cylinder being provided with hydraulic pressure through line 60 schematically illustrated by dotted line FIGURE 2, the purpose and actuation of cylinder and piston 59 to be described in more detail hereinafter.

The face 14 of the fly wheel 13 is scored to form grooves 61 and 62 to provide guide means for crank balancing arm 24 and crank lever 15 respectively through guide pins 63 and 64.

Servo piston 59 is actuated by pressure produced in subsidiary oil line 65 indicated in FIGURE 1, so arranged to transmit oil pressure and to distribute the pressure to inner line 66 within shaft 11, thence to line 60 in the same manner as that provided for line 55 in communication with line 31 as described. Oil line 65 preferably communicates with the steering location of the vehicle where pressure may be produced through a hand operated lever or piston (not shown).

In operation, the free end of input shaft 11 remote from the fly wheel 13 is connected to a source of rotary motive power of any conventional form, for example, an internal combustion engine. In the normal position of the components of the transmission while the vehicle is at rest, the crank lever arm 15 and its attendant crank balance arm 24 assume the position as indicated in FIGURE 2, wherein the enlarged portion of arm 32 is disposed substantially centrally of the face 14 of the fly wheel 13.

To initiate operation of the mechanism, the servo piston 59 is actuated from the operating compartment of the vehicle by means of a lever providing pressure in subsidiary oil line 65 thereby forcing the piston in cylinder 59 to displace the crank lever arm 15 slightly from its normal position against the bias of spring 17, thereby moving the inner end of arm 32 from its central location on the fly wheel 13. Thus upon rotation of the fly wheel 13, the inner end of the rigidly connected crank arm 32 has imparted thereto a rotary motion describing a circle having a radius dependant upon the distance the crank lever arm 15 is displaced from its normal central position.

Upon rotation of this portion of the arm 32, its extension members 35 are caused to oscillate in substantially a longitudinal motion, the other end of the arm 32 being held through the universal joint 34 and the forked member 33a.

The oscillating motion of the extension arms 35 is transmitted through ball and socket joints 36 and 37 to actuating rods 38, which, through ball members 39 and pin members 40, cause oscillating motion of the corresponding annular portions 43 of ratchets 41.

As described above, the inner annular portion 43 of each ratchet 41 is caused to oscillate in opposite directions, the toothed portion 32 of each ratchet 41 being urged positively in one direction only, in the manner of known one way ratchets or clutches.

The extension arms 35, through the actuating rods 38, are so disposed with respect to their respective ratchets 41, that, upon oscillation, each ratchet 41 is urged in its positive driving direction in an overlapping relationship, so that a constant driving force is transmitted through the lower ratchet to pinion 44. For the purpose of illustration, assuming a stroke of a ratchet of 180° as indicated by the letter A, in FIGURE 4, then, as the ratchet is driven through 90°, the next ratchet is caused to be activated in a driving direction indicated by the reference letter B, and as ratchet B passes its first 90° quadrant, ratchet A ceases to drive and ratchet C commences its operation of 180°. Upon completion of the first quadrant of ratchet C's operation, ratchet D is positively activated, and with the positive drive of B ends, ratchet A is again actuated, completing the overlapping cycle.

The degree of oscillation is obviously dependant upon the position of the inner end of the crank arm 32, in association with the outer extremity 18 of the throw crank lever 15. Assuming rotation of the flywheel 13, upon initiating the oscillation through servo piston and cylinder 59, the pinion 44 and driven shaft 48 are caused to rotate, and the vehicle commences movement. The rotation of the driven shaft 48 causes actuation of the gear pump through the spur gear 50 and idler gear 51, thereby creating pressure in oil line 55, which is in turn communicated to the piston and cylinder assembly 19 and 21 respectively. The pressure exerted on piston face 19a causes throw crank lever 15 to move radially about its pivot 16 toward the periphery of the flywheel 13, thus creating a greater degree of oscillation of the actuating rods 38 and consequent increased speed of rotation of the driven shaft resulting in an increased speed of the vehicle, whereby the gear pump 50 and 51 exerts a greater pressure in the hydraulic line 55 to force the throw crank lever 15 outwardly to provide a further increase in the speed of the vehicle. The resultant increase in speed is achieved through the variable throw of the crank arm 32 and its attendant throw crank lever 15 wherein maximum power is utilized in overcoming the maximum torque created in commencing and maintaining movement of the vehicle.

Upon movement of piston 19 under pressure, face 19b of the double acting piston 19 within cylinder 21 exerts pressure through hydraulic fluid in line 29 to the piston in cylinder 22, thereby actuating throw balance lever 24 about its pivotal mounting to a position opposite that of the throw crank lever 15. The weighted extremity of lever 24 is adapted to balance the tendency of tangential throw of the inner connecting end 18 of lever 15, lever 24 being actuated automatically in conjunction with lever 15, thereby effecting vibration-free operation of the device during rotation of the flywheel 13. In the neutral position, the inner extremity 18 of lever 15 is adapted to overlie the recessed portion of the balance lever 24 to permit each extremity to attain a central position under the bias of springs 17 and 26.

The transmission may incorporate a device to maintain the throw crank 15 in any predetermined position to provide greater acceleration without increasing the ratio, especially when used for vehicles as opposed to stationary locations. Vacuum diaphragm 56 is inserted in the flow of oil line 55 and may be actuated by means of the pressure differential provided in the engine carburetor and throat when the throttle is quickly opened, thereby maintaining the pressure in oil line 55 without further increase. By this means, the throw crank lever 15 is maintained at a predetermined position intermediate its central and maximum outward position while the engine revolutions are increased, thereby effecting a greater acceleration than is normally accomplished under full torque conditions.

The transmission as described has free-wheeling tendencies, whereby, upon deceleration of the engine, no opposing force is developed to provide engine braking. To provide deceleration for vehicles, the invention contemplates the positioning of a valve 58 in oil line 55, FIGURE 1, actuable by a solenoid or other device and controlled from the steering position such that, upon releasing the throttle, the valve may restrict or partially restrict the pressure transmitted from the gear pump to provide a back pressure in the pump area, thereby creating a resistance to coasting of the vehicle. The solenoid may be activated, either manually or automatically, through an electrical connection to the throttle, to restrict the flow, as described.

The contoured face 14 of the flywheel 13 preferably has a radius of curvature equal to the length of the crank arm 32, the face 14 of the flywheel 13 supporting the crank arm 32 being formed into a concave surface.

A pressure relief valve may be incorporated in the hydraulic system to prevent excessive build-up of pressure from the gear pump, the overflow being vented to the sump for subsequent circulation.

The invention contemplates a variable throw transmission wherein different overall speed or torque ratios may be accomplished through design of the transmission and other portions of the vehicle. The ratio may be altered through restriction of the throw crank lever 15 in its displacement to dispose the crank arm 32 at a lesser maximum angle from its normal central position. The lengths of the crank arm 32 and its attendant extension arms 35 may be varied to provide a lesser or greater thrust to the geared portions 42 of the ratchets 41. A means of changing the overall ratio may reside in the design and size of the pinion gear 44 with respect to the geared portion 42 of its connecting ratchet. Other changes may be effected either separately or in combination with the aforementioned features, for example, by providing a different ratio between the crown and pinion gears within the rear end differential, without departing from the scope of the invention as defined by the claims.

It is contemplated that the transmission may be used to provide a power take-off when the vehicle is standing, to operate hydraulic jacks or a power winch for vehicle uses, for example, in aiding propulsion under conditions when the vehicle is rendered immovable due to ice, mud, snow or the like. A jaw clutch may be provided in the drive shaft between the differential and the gear pump so that connection to the drive wheels may be broken while permitting connection of the gear pump to provide a source of pressure to the winch or jacks.

What I claim is:

1. A system for transmitting power, comprising in combination: a housing adapted to enclose said system; an input shaft journalled within said housing and communicating with a source of rotary motive power remote therefrom; a flywheel disposed within said housing and adapted for rotation with said input shaft; a throw crank member, generally in the form of a lever, disposed transversely of said input shaft and overlying the face of said flywheel remote from said source of power, said throw crank member having one end thereof pivotally mounted on said face, at a point adjacent the periphery of said flywheel, the other end of said throw crank member being displaced from said one end a predetermined distance corresponding substantially to the distance between said one end and the axis of rotation of said input shaft, said other end being movable relative to said face; a throw balance lever member disposed in substantially diametrically opposed position from that of said throw crank member, said throw balance lever member being pivotally mounted, at one end thereof, on said face at a point diametrically opposed to that of said one end of said throw crank member, the other end of said throw balance lever member being weighted and displaced from said diametrically opposed point said predetermined distance and being movable, simultaneously with said other end of said throw crank member, relative to said face; connecting means selected from the group of universal joints and ball-and-socket joints, said connecting means being substantially aligned with said input shaft by a rigid bracing member communicating with said housing, and being displaced a predetermined distance from said flywheel; a relatively elongated crank arm embodying, at the inner extremity thereof, means pivotally mounting said arm upon said other end of said throw crank member, and embodying, at the outer extremity thereof, means pivotally communicating said arm with said connecting means; gear means substantially aligned with said input shaft and displaced a predetermined distance from said flywheel, said gear means communicating with said crank arm and being adapted to transmit at least a portion of the motion produced therein to an output shaft, said output shaft being journalled within said housing for rotation therein and extending therefrom; and means for simultaneously controlling the diametrically opposed positions of said other ends of said throw crank member and of said throw balance lever member, rendering said positions directly dependent upon the speed of rotation of said output shaft.

2. The system for transmitting power, as claimed in claim 1, in which said face of said flywheel is concave, the radius of curvature of said face corresponding to the radius of rotation of said crank arm about said connecting means.

3. A system for transmitting power, comprising in combination: a housing adapted to enclose said system; an input shaft journalled within said housing and communicating with a source of rotary motive power remote therefrom; a flywheel disposed within said housing and adapted for rotation with said input shaft; a throw crank member, generally in the form of a lever, disposed transversely of said input shaft and overlying the face of said flywheel remote from said source of power, said throw crank member having one end thereof pivotally mounted on said face, at a point adjacent the periphery of said flywheel, the other end of said throw crank member being displaced from said one end a predetermined distance corresponding substantially to the distance between said one end and the axis of rotation of said input shaft, said other end being movable relative to said face; a throw balance lever member disposed in substantially diametrically opposed position from that of said throw crank member, said throw balance lever member being pivotally mounted, at one end thereof, on said face at a point diametrically opposed to that of said one end of said throw crank member, the other end of said throw balance lever member being weighted and displaced from said diametrically opposed point said predetermined distance and being movable, simultaneously with said other end of said throw crank member, relative to said face; connecting means selected from the group of universal joints and ball-and-socket joints, said connecting means being substantially aligned with said input shaft by a rigid bracing member communicating with said housing, and being displaced a predetermined distance from said flywheel; a relatively elongated crank arm embodying, at the inner extremity thereof, means pivotally mounting said arm upon said other end of said throw crank member, and embodying, at the outer extremity thereof, means pivotally communicating said crank arm with said connecting means; a gear assembly composed of four quadrangularly arranged ratchet-type gear members, each of said gear members having an outer toothed portion and an inner annular portion, said annular portion embodying a pin member therein and projecting therefrom, said gear assembly further comprising a pinion gear, said pinion gear being adapted for driving engagement with one of said gear members, and being rigidly attached to the extremity of an output shaft and being adapted to rotate therewith, said output shaft being journalled within said housing for rotation therein and extending therefrom; extension members radially disposed about said crank arm and in fixed relation thereto, said extension members embodying, at the ends thereof, socket members, said socket members being adapted to engage ball members disposed at the ends of a like number of longitudinally extending actuating rods, said actuating rods embodying at the ends thereof remote from said socket members, further ball members, said further ball members being adapted for driving engagement with said pin members on said inner annular portions of said ratchet-type gear members and adapted to transmit at least a portion of the motion produced in said crank arm thereto; and means for simultaneously controlling the diametrically opposed positions of said other ends of said throw crank member and of said throw balance lever member, rendering said positions directly dependent upon the speed of rotation of said output shaft.

4. The system for transmitting power, as claimed in claim 3, in which said face of said flywheel is concave, the radius of curvature of said face corresponding to the radius of rotation of said crank arm about said connecting means.

5. The system for transmitting power, as claimed in claim 4, in which said means for simultaneously controlling the positions of said other ends of said throw crank member and of said throw balance lever member consists of fluid pressure producing means in association with said output shaft, said pressure varying with the speed of rotation of said output shaft, and being transmitted to fluid pressure responsive means, said latter means being mounted in substantially diametrically opposed positions on said face of said flywheel, one of said fluid pressure responsive means being adapted to displace said throw crank member relative to said face about its pivot member, another of said fluid pressure responsive means being provided to effect simultaneous, equal and opposite displacement of said throw balance lever member relative to said face about its pivot member.

6. The system for transmitting power, as claimed in claim 5, in which said fluid pressure producing means consists of a gear pump rigidly attached to said output shaft, and in which said fluid pressure responsive means consist of suitably disposed piston-and-cylinder assemblies.

7. The system for transmitting power, as claimed in claim 5, in which spring biasing means are provided in substantially diametrically opposed locations on said face of said flywheel, one of said spring means being adapted to urge said throw crank member to a position wherein said inner extremity of said crank arm overlies the centre of rotation of said flywheel, another of said spring means being adapted to effect simultaneous urging of said throw balance lever member to a position overlying said centre of rotation and underlying said inner extremity of said crank arm.

8. The system for transmitting power, as claimed in claim 7, in which the pressure developed by said gear pump is transmitted to said piston-and-cylinder assemblies through oil lines communicating therebetween.

9. The system for transmitting power, as claimed in claim 8, in which guide means, in the form of grooves, are provided in said face of said flywheel, and in which said throw crank member and said throw balance lever member each embody guide pin members adapted to travel within said guide means when said throw crank member and said throw balance lever member are displaced relative to said face about their respective pivot members.

10. The system for transmitting power, as claimed in claim 9, said system further comprising a servo piston assembly in engagement with said throw crank member, said assembly being actuable from a location remote from said housing and being adapted, upon actuation thereof, to effect initial displacement of said throw crank member from its normal position overlying said axis of rotation, said displacement being relative to said face and about said pivot member.

11. The system claimed in claim 1 in which said means for simultaneously controlling the positions of said other ends of said throw crank member and of said throw balance lever member consists of fluid pressure producing means in association with said output shaft, said pressure varying with the speed of rotation of said output shaft, and being transmitted to fluid pressure responsive means, said latter means being mounted in substantially diametrically opposed positions on said face of said flywheel, one of said fluid pressure responsive means being adapted to displace said throw crank member relative to said face about its pivot member, another of said fluid pressure responsive means being provided to effect simultaneous, equal and opposite displacement of said throw balance lever member relative to said face about its pivot member.

12. The system claimed in claim 11 in which said fluid pressure producing means consists of a gear pump rigidly attached to said output shaft, and in which said fluid pressure responsive means consist of suitably disposed piston-and-cylinder assemblies.

13. The system claimed in claim 1 in which spring biasing means are provided in substantially diametrically opposed locations on said face of said flywheel, one of said spring means being adapted to urge said throw crank member to a position wherein said inner extremity of said crank arm overlies the centre of rotation of said flywheel, another of said spring means being adapted to effect simultaneous urging of said throw balance lever member to a position overlying said centre of rotation and underlying said inner extremity of said crank arm.

14. The system claimed in claim 11 in which the pressure developed by said pressure producing means is transmitted to said fluid pressure responsive means through oil lines communicating therebetween.

15. The system claimed in claim 1 in which guide means, in the form of grooves, are provided in said face of said flywheel, and in which said throw crank member and said throw balance lever member each embody guide pin members adapted to travel within said guide means when said throw crank member and said throw balance lever member are displaced relative to said face about their respecive pivot members.

16. The system claimed in claim 1 and further comprising a servo piston assembly in engagement with said throw crank member, said assembly being actuable from a location remote from said housing and being adapted, upon actuation thereof, to effect initial displacement of said throw crank member from its normal position overlying said axis of rotation, said displacement being relative to said face and about said pivot member.

17. The system claimed in claim 3 in which said means for simultaneously controlling the positions of said other ends of said throw crank member and of said throw balance lever member consists of fluid pressure producing means in association with said output shaft, said pressure varying with the speed of rotation of said output shaft, and being transmitted to fluid pressure responsive means, said latter means being mounted in substantially diametrically opposed positions on said face of said flywheel, one of said fluid pressure responsive means being adapted to displace said throw crank member relative to said face about its pivot member, another of said fluid pressure responsive means being provided to effect simultaneous, equal and opposite displacement of said throw balance lever member relative to said face about its pivot member.

18. The system claimed in claim 3 in which spring biasing means are provided in substantially diametrically opposed locations on said face of said flywheel, one of said spring means being adapted to urge said throw crank member to a position wherein said inner extremity of said crank arm overlies the centre of rotation of said flywheel, another of said spring means being adapted to effect simultaneous urging of said throw balance lever member to a position overlying said centre of rotation and underlying said inner extremity of said crank arm.

19. The system claimed in claim 3 in which guide means, in the form of grooves, are provided in said face of said flywheel, and in which said throw crank member and said throw balance lever member each embody guide pin members adapted to travel within said guide means when said throw crank member and said throw balance lever member are displaced relative to said face about their respective pivot members.

20. The system claimed in claim 3 and further comprising a servo piston assembly in engagement with said throw crank member, said assembly being actuable from a location remote from said housing and being adapted, upon actuation thereof, to effect initial displacement of said throw crank member from its normal position overlying said axis of rotation, said displacement being relative to said face and about said pivot member.

21. A system for transmitting power comprising in combination: a housing adapted to enclose said system; an input shaft journalled within said housing and communicating with a source of rotary motive power remote therefrom; a flywheel disposed within said housing and adapted for rotation with said input shaft; a throw crank member, generally in the form of a lever, disposed transversely of said input shaft and overlying the face of said flywheel remote from said source of power, said throw crank member being pivotally mounted, at one end thereof, at a point on said face adjacent the periphery of said flywheel, the other end of said throw crank member being displaced from said one end a distance corresponding substantially to the distance between said point and the axis of rotation of said flywheel and being rotatably displaceable relative to said face about said point; throw balance lever means pivotally disposed on said face in substantially diametrically opposed location from said throw crank member and effectively counter-balancing said throw crank member; a relatively elongated crank arm pivotally communicating, at the inner extremity thereof, with said other end of said throw crank member, the outer extremity of said crank arm being pivotally mounted at a point substantially aligned with the axis of rotation of said flywheel and displaced from said flywheel a predetermined distance; gear means substantially aligned with said input shaft and displaced a predetermined distance from said flywheel, said gear means communicating with said crank arm and being adapted to transmit at least a portion of the motion produced therein to an output shaft, said output shaft being journalled within said housing for rotation therein and extending therefrom; and means for simultaneously controlling the diametrically opposed positions of said throw crank member and of said throw balance lever member, rendering said positions directly dependent upon the speed of rotation of said output shaft.

References Cited in the file of this patent

UNITED STATES PATENTS

| | | |
|---|---|---|
| 212,621 | Patric | Feb. 25, 1879 |
| 934,689 | Nelson | Sept. 21, 1909 |
| 2,062,241 | Viberg | Nov. 24, 1934 |
| 2,427,598 | Gouirand | Sept. 16, 1947 |

FOREIGN PATENTS

| | | |
|---|---|---|
| 370,931 | Great Britain | Apr. 11, 1932 |